United States Patent
Kim

(10) Patent No.: US 8,241,578 B2
(45) Date of Patent: Aug. 14, 2012

(54) CATALYTIC APPARATUS FOR VEHICLE

(75) Inventor: Sangbeom Kim, Hwaseong-si (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 323 days.

(21) Appl. No.: 12/619,550

(22) Filed: Nov. 16, 2009

(65) Prior Publication Data

US 2010/0143210 A1    Jun. 10, 2010

(30) Foreign Application Priority Data

Dec. 4, 2008    (KR) .................. 10-2008-0122503

(51) Int. Cl.
*B01D 50/00*    (2006.01)

(52) U.S. Cl. ........................................ 422/177

(58) Field of Classification Search ............... 422/177, 422/180
See application file for complete search history.

(56) References Cited

U.S. PATENT DOCUMENTS

| | | | | |
|---|---|---|---|---|
| 4,425,304 A | * | 1/1984 | Kawata et al. | 422/171 |
| 5,331,810 A | * | 7/1994 | Ingermann et al. | 60/322 |
| 5,953,817 A | * | 9/1999 | Watanabe et al. | 29/890 |
| 6,884,398 B1 | | 4/2005 | Biel, Jr. et al. | |
| 7,252,808 B2 | | 8/2007 | Tursky | |
| 2004/0234427 A1 | * | 11/2004 | Tursky | 422/177 |
| 2006/0171865 A1 | * | 8/2006 | Quackenbush | 422/168 |

FOREIGN PATENT DOCUMENTS

| | | | |
|---|---|---|---|
| DE | 19744191 A1 | * | 4/1998 |
| JP | 2005-76453 A | | 3/2005 |
| KR | 10-0293786 B1 | | 9/2001 |

* cited by examiner

*Primary Examiner* — Tom Duong
(74) *Attorney, Agent, or Firm* — Morgan, Lewis & Bockius LLP

(57) ABSTRACT

A catalytic apparatus for a vehicle, may include a caning that is a single hollow unit with both distal ends open, a front substrate and a rear substrate that are disposed apart from each other with a predetermined space therebetween in the caning, and a front flange that is connected to one of the distal ends of the caning to be joined with a front muffler pipe connected to an exhaust manifold and has a bottom portion inclined toward the center axis of the front substrate in the vertical cross section.

8 Claims, 2 Drawing Sheets

CATALYTIC APPARATUS FOR VEHICLE

CROSS-REFERENCE TO RELATED APPLICATIONS

The present application claims priority to Korean Patent Application Number 10-2008-0122503 filed Dec. 4, 2008, the entire contents of which application is incorporated herein for all purposes by this reference.

BACKGROUND OF THE INVENTION

1. Field of the Invention

The present invention relates to a catalytic apparatus for a vehicle that is coated with a precious metal and purifies exhaust gas.

2. Description of Related Art

With the increases of use of vehicles and the traffic volume, air pollution due to exhaust gas is on the rise as a serious social problem and the governments of the world has established discharge standards of pollutants in exhaust gas, such as carbon monoxide (CO), hydrocarbon (HC), and nitrogen oxide (NOx) to regulate the exhaust gas and these regulations are gradually enforced.

Precious metal catalytic apparatus are used in vehicles to satisfy the discharge standards of exhaust gas and a catalytic apparatus of the related art is shown in FIGS. 1 and 2.

A catalytic apparatus 10 of the related art, as shown in the figures, includes a caning 11 where an upper shell 11a and a lower shell 11b are welded, a lower shell cover 12 that is welded to the outer surface of lower shell 11b, a front flange 13 and a rear flange 14 that is integrally connected to the front and rear ends of caning 11 and connected with a front muffler pipe (not shown) and a rear muffler pipe (not shown), respectively, and front substrate 15 and a rear substrate 16 that are disposed apart from each other in caning 11, and mats 17, 18 that cover front substrate 15 and rear substrate 16, respectively.

Front substrate 15 and rear substrate 16 reduce a great amount of pollutants discharged into the atmosphere by accelerating dissolution of hydrocarbon, oxidation of carbon monoxide, and reduction of nitrogen oxide contained in exhaust gas.

A sensor hole 19 is formed through caning 11 to attach a rear oxygen sensor (not shown) and, sensor hole 19 is formed at lower shell 11b.

However, catalytic apparatus 10 having the above configuration in the related art has a problem in that the number of parts and the cost increase because caning 11 is composed of upper shell 11a and lower shell 11b.

Further, catalytic apparatus 10 of the related art is assembled by disposing front substrate 15 and rear substrate 16 into lower shell 11b, disposing upper shell 11a on lower shell 11b, and then combining upper shell 11a with lower shell 11b by welding the flange that is the joint of them. However, there is a problem in that it is substantially impossible to weld the entire joint of upper shell 11a and lower shell 11b at uniform pressure, such that non-uniform surface pressure is applied to front substrate 15 and rear substrate 16 and the performance of front substrate 15 and rear substrate 16 is decreased.

Further, catalytic apparatus 10 of the related art has a problem in that it is difficult to change the mold because the cost for manufacturing the mold increases when it is required to change the position of sensor hole 19 from upper shell 11a to lower shell 11b or from lower shell 11b to upper shell 11a.

Further, referring to the cross section of front flange 13 shown in FIG. 2, in catalytic apparatus 10 of the related art, since the bottom 13a is horizontally formed in the longitudinal direction of caning 11 at a predetermined position from the center of front substrate 15, there is a problem in that exhaust gas flowing inside through front flange 13 cannot pass through the center of front substrate 15 and the performance of purifying toxic substances of front substrate 15 is reduced.

Further, there is a problem in that since the diameter D1 of an inlet 13b and the diameter D2 of an outlet 13c of front flange 13 are the same, exhaust gas flowing inside through front flange 13 passes through front substrate 15 at a high velocity and accordingly front substrate 15 cannot sufficiently purify the toxic substances.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a catalytic apparatus for a vehicle that makes it possible to reduce the number of parts and the cost by manufacturing a caning as a single unit that is not divided into an upper shell and a lower shell, improve the purification performance of a front substrate and a rear substrate by inserting the front substrate and the rear substrate in the single unit-typed caning such that uniform surface pressure is applied to the front substrate and the rear substrate, and change the position of a sensor hole to an optimal position in the single unit-typed caning without increasing the cost of the mold.

Further, the present invention is directed to improve the performance of purifying toxic substances and reduce purification time by making the volume of the front substrate larger than the volume of the rear substrate.

Further, the present invention is directed to improve the purification performance of the front substrate by inclining the bottom of a front flange to face the center of the front substrate in order to guide exhaust gas flowing inside through the front flange to pass through the center of the front substrate, and also improve the purification performance of the front substrate by making the diameter of an outlet of the front flange larger than the diameter of an inlet in order to reduce the velocity of exhaust gas passing through the front substrate.

In an aspect of the present invention, the catalytic apparatus for a vehicle, may include a caning that is a single hollow unit with both distal ends open, a front substrate and a rear substrate that are disposed apart from each other with a predetermined space therebetween in the caning, and a front flange that is connected to one of the distal ends of the caning to be joined with a front muffler pipe connected to an exhaust manifold and has a bottom portion inclined toward the center axis of the front substrate in the vertical cross section.

The front substrate may be larger in volume than the rear substrate.

The front flange may have an inlet portion that is connected with the front muffler pipe and allows exhaust gas to flow inside and an outlet portion that is connected to the one of the distal ends of the canning and allows the exhaust gas to be discharged therethrough, and the bottom portion is a surface connecting the inlet portion and the outlet portion and gradually inclined upward from the inlet portion to the outlet portion such that the center axis of the outlet is aligned with the center axis of the front substrate.

The outlet portion of the front flange in diameter may be formed larger than the inlet portion in diameter.

In another aspect of the present invention, the catalytic apparatus for the vehicle may include a rear flange that is connected to the other one of the distal ends of the caning to be connected with a rear muffler pipe.

In further another aspect of the present invention, the catalytic apparatus for the vehicle may further include mats that cover the front substrate and the rear substrate, respectively.

The catalytic apparatus for the vehicle may further include a sensor hole that is formed through the caning at the predetermined space formed between the front substrate and the rear substrate to attach an oxygen sensor thereto.

The catalytic apparatus for the vehicle may include a caning cover that is attached to a portion of the outer circumference of the caning.

According to the catalytic apparatus for a vehicle, it is possible to reduce the number of parts and the cost by manufacturing the caning as a single unit, improve the purification performance of the front substrate and the rear substrate disposed in the single unit-typed caning by applying uniform surface pressure to the front substrate and the rear substrate, and form a sensor hole at an optimal position such that a rear oxygen sensor is provided with the most high performance, without increasing the cost for the mold.

Further, according to the catalytic apparatus for a vehicle, it is possible to improve performance of purifying toxic substances and reduce the purification time by making the volume of the front substrate larger than the volume of the rear substrate, and considerably improve the purification performance of the front substrate by making the diameter of an outlet larger than the diameter of an inlet while inclining the bottom of the front flange to face the center of the front substrate.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
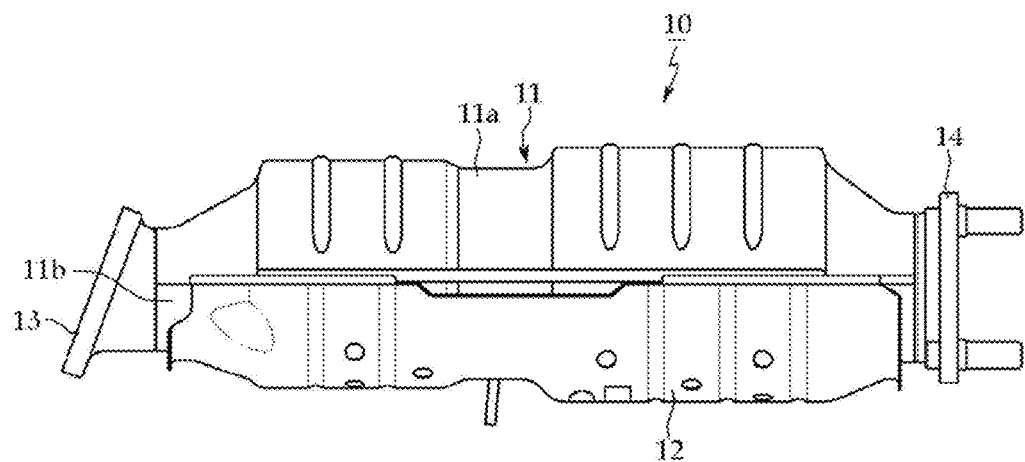
FIG. 1 is a perspective view of a catalytic apparatus of the related art.
Figure 2:
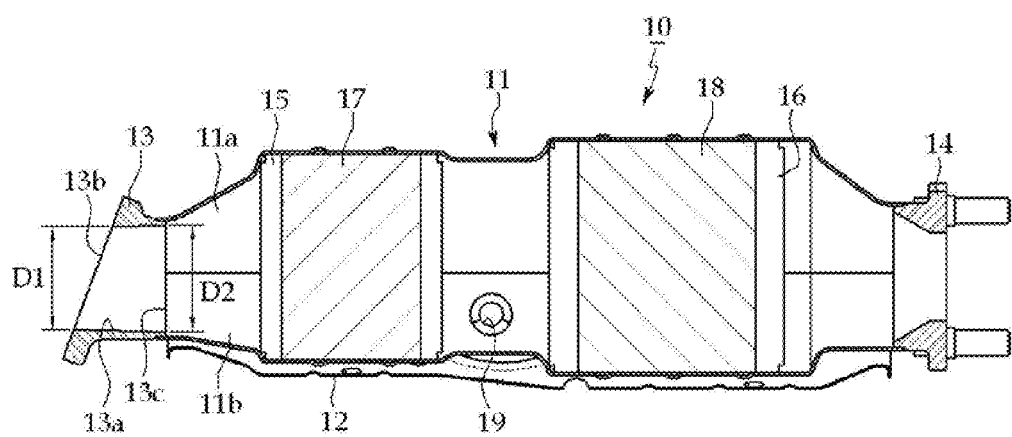
FIG. 2 is a cross-sectional view of FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
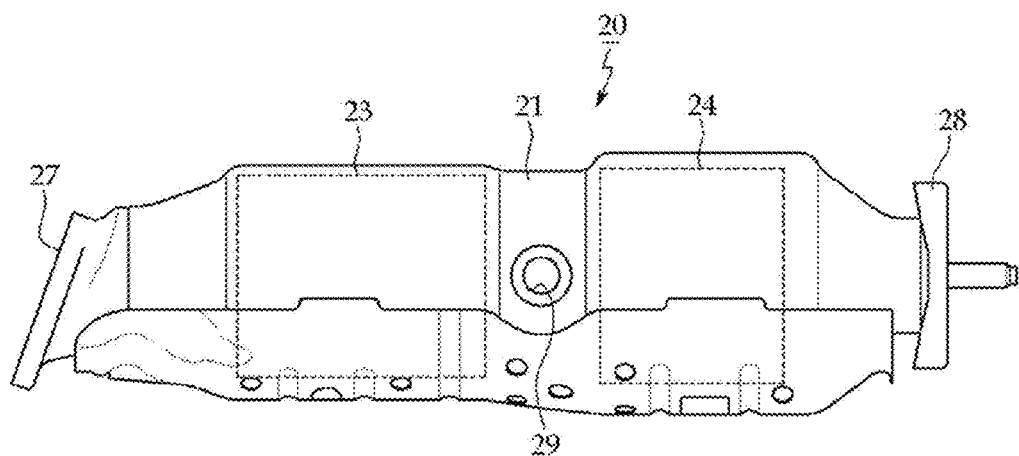
FIG. 3 is a perspective view of a catalytic apparatus according to an exemplary embodiment of the present invention.
Figure 4:
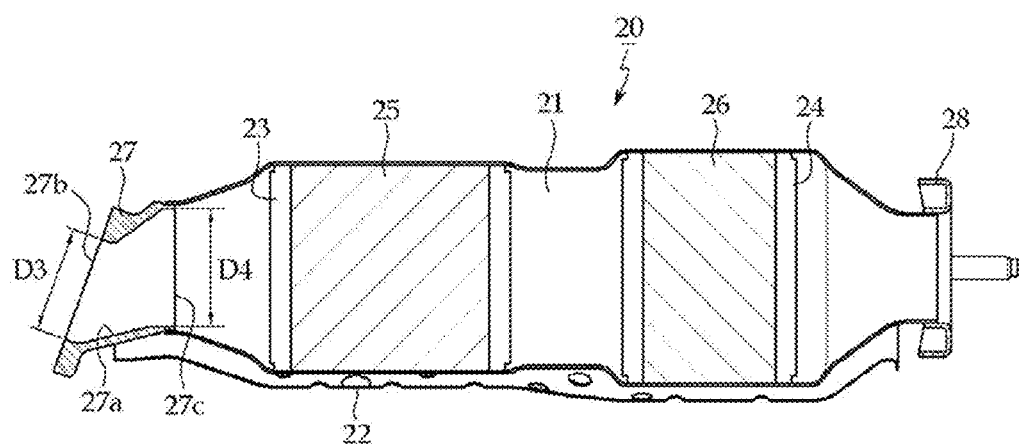
FIG. 4 is a cross-sectional view of FIG. 3.

FIGS. 3 and 4 show views illustrating a catalytic apparatus according to an exemplary embodiment of the present invention.

A catalytic apparatus 20 according to an exemplary embodiment of the present invention, as shown in the figures, includes a caning 21 that is a one hollow unit with both ends open; a caning cover 22 that is welded to a portion of the outer circumference of caning 21, a front substrate 23 and a rear substrate 24 that are inserted in caning 21 and fixed apart from each other; mats 25, 26 that cover front substrate 23 and rear substrate 24, respectively, a front flange 27 that is connected to one end of caning 21 to be joined with a front muffler pipe connected to an exhaust manifold and has a bottom 27a inclined toward the center of front substrate 23 in the vertical cross section, a rear flange 28 that is connected to the other end of caning 21 to be joined with a rear muffler pipe, and a sensor hole 29 that is formed through caning 21 between front substrate 23 and rear substrate 24 to attach a rear oxygen sensor (not shown) at an optimal position.

Front substrate 23 and rear substrate 24 reduce a great amount of pollutants discharged into the atmosphere by accelerating dissolution of hydrocarbon, oxidation of carbon monoxide, and reduction of nitrogen oxide contained in exhaust gas.

In this configuration, front substrate 23 is larger in volume than rear substrate 24 and front substrate 23 is disposed closer to the engine to purify more toxic substances, such that it is possible to improve the entire performance of purifying toxic substances and reduce purification time.

Further, front flange 27 has an inlet 27b that is connected with the front muffler pipe and allows exhaust gas to flow inside and an outlet 27c that is connected to one end of canning 21 and allows the exhaust gas to be discharged, in which bottom 27a is a surface gradually inclined upward from inlet 27b to outlet 27c such that outlet 27c is aligned with the center of front substrate 23.

That is, in the vertical cross section of front flange 27, inlet-sided bottom 27b at the lower portion is positioned under the center of front substrate 23 and outlet-sided bottom 27c is gradually inclined upward from inlet-sided bottom 27b to face the center of front substrate 23.

By inclining bottom 27a of front flange 27, exhaust gas flowing inside through front flange 27 is guided to pass through the center of front substrate 23 by bottom 27a, thereby considerably improving the performance of purifying toxic substances of front substrate 15.

Further, front flange 27 is formed such that the diameter D3 of inlet 27b is larger than the diameter D4 of outlet 27c.

Accordingly, the exhaust gas of which the flow velocity has decreased across front flange 27 passes through front substrate 23 at a low velocity and front substrate 23 correspondingly has sufficient time to purify the toxic substances, such that the performance of purifying toxic substances of front substrate 15 is significantly improved.

Further, the present invention makes it possible to reduce the number of parts and the cost by manufacturing caning 21 as a single unit, which is not divided into an upper shell and a lower shell.

Further, front substrate 23 and rear substrate 24 are inserted in caning 21 through both ends and fixed therein, such that uniform surface pressure is applied to front substrate 23 and rear substrate 24, and as a result, the purification performance of front substrate 23 and rear substrate 24 is improved.

That is, front substrate 23 and rear substrate 24 are completely installed in caning 21 by manufacturing caning 21 having a space where front substrate 23 and second support 24 are disposed, inserting front substrate 23 and second support 24 through both ends of caning 21 and fixing them, and then narrowing both ends of caning 21 in a cone shape.

Further, the present invention makes it possible to form sensor hole 29 at an optimal position such that the rear oxygen sensor is provided with the most high performance, without increasing the cost for the mold, by manufacturing caning 21 as a single unit.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A catalytic apparatus for a vehicle, comprising:
   a caning that is a single hollow unit with both distal ends open;
   a front substrate and a rear substrate that are disposed apart from each other with a predetermined space therebetween in the caning; and
   a front flange that is connected to one of the distal ends of the caning to be joined with a front muffler pipe connected to an exhaust manifold and has a bottom portion inclined toward the center axis of the front substrate in the vertical cross section;
   wherein the front flange has an inlet portion that is connected with the front muffler pipe and allows exhaust gas to flow inside and an outlet portion that is connected to the one of the distal ends of the canning and allows the exhaust gas to be discharged therethrough;
   wherein the bottom portion is a surface connecting the inlet portion and the outlet portion and gradually inclined upward from the inlet portion to the outlet portion such that the center axis of the outlet portion is aligned with the center axis of the front substrate; and
   wherein the outlet portion of the front flange in diameter is formed larger than the inlet portion in diameter.

2. The catalytic apparatus for the vehicle as defined in claim 1, wherein the front substrate is larger in volume than the rear substrate.

3. The catalytic apparatus for the vehicle as defined in claim 1, further comprising a rear flange that is connected to the other one of the distal ends of the caning to be connected with a rear muffler pipe.

4. The catalytic apparatus for the vehicle as defined in claim 1, further comprising mats that cover the front substrate and the rear substrate, respectively.

5. The catalytic apparatus for the vehicle as defined in claim 1, further comprising a sensor hole that is formed through the caning at the predetermined space formed between the front substrate and the rear substrate to attach an oxygen sensor thereto.

6. The catalytic apparatus for the vehicle as defined in claim 1, further comprising a caning cover that is attached to a portion of the outer circumference of the caning.

7. The catalytic apparatus for the vehicle as defined in claim 1, wherein a center axis of the inlet portion in the front flange and the center axis of the outlet portion in the front flange are not parallel.

8. The catalytic apparatus for the vehicle as defined in claim 1, wherein an inner diameter of the inlet portion in the first flange is uniform in an axial direction thereof.

\* \* \* \* \*